United States Patent [19]
Garland

[11] Patent Number: 5,938,155
[45] Date of Patent: Aug. 17, 1999

[54] MOUNT SYSTEM FOR SUPPORTING BINOCULARS ON A TRIPOD

[76] Inventor: Randy N. Garland, 1018 E. Renee Dr., Phoenix, Ariz. 85024

[21] Appl. No.: 08/740,338

[22] Filed: Nov. 7, 1996

[51] Int. Cl.$^6$ .................................................. F16M 11/04
[52] U.S. Cl. .................................... 248/187.1; 248/177.1; 359/413
[58] Field of Search ............................ 248/187.1, 186.1, 248/154, 177.1, 176.1, 131, 313, 74.3, 73, 74.2, 74.1, 178.1, 186.2, 902; 359/413, 409; 206/316.3; 224/909

[56] References Cited

U.S. PATENT DOCUMENTS

| | | | |
|---|---|---|---|
| 411,527 | 9/1889 | Meyrowitz | 359/409 |
| 991,192 | 5/1911 | Battenfeld | 248/154 |
| 2,444,453 | 7/1948 | Larson | 359/413 |
| 3,149,808 | 9/1964 | Weckesser | 248/74.3 |
| 3,423,056 | 1/1969 | Welt | 248/187 |
| 4,063,704 | 12/1977 | Rother | 248/515 |
| 4,447,934 | 5/1984 | Anscher | 248/74.3 |
| 4,557,451 | 12/1985 | Conway | 248/187 |
| 4,925,136 | 5/1990 | Knott | 248/74.3 |
| 4,944,005 | 7/1990 | Van Dyke | 248/74.3 |
| 5,020,760 | 6/1991 | Mayr | 248/313 |

Primary Examiner—Ramon O. Ramirez
Assistant Examiner—Gwendolyn Baxter
Attorney, Agent, or Firm—Martin L. Stoneman

[57] ABSTRACT

This invention provides a mount system for supporting binoculars on a camera-type tripod, particularly, a mount system wherein a single monocular barrel of such binoculars may be securely supported and mounted on such tripod for using such binoculars. A rigid L-cross-sectioned cradle member, in concert with an adjustable strap between the ends of the arms of the cradle member, provides the holding means for secure grasping of the circular objective-lens end portion of a monocular barrel, and the cradle member is attachable to a panning head of a tripod, providing secure tripod support for the binoculars without hindering or restraining normal adjustment of the binoculars by a user-viewer.

21 Claims, 2 Drawing Sheets

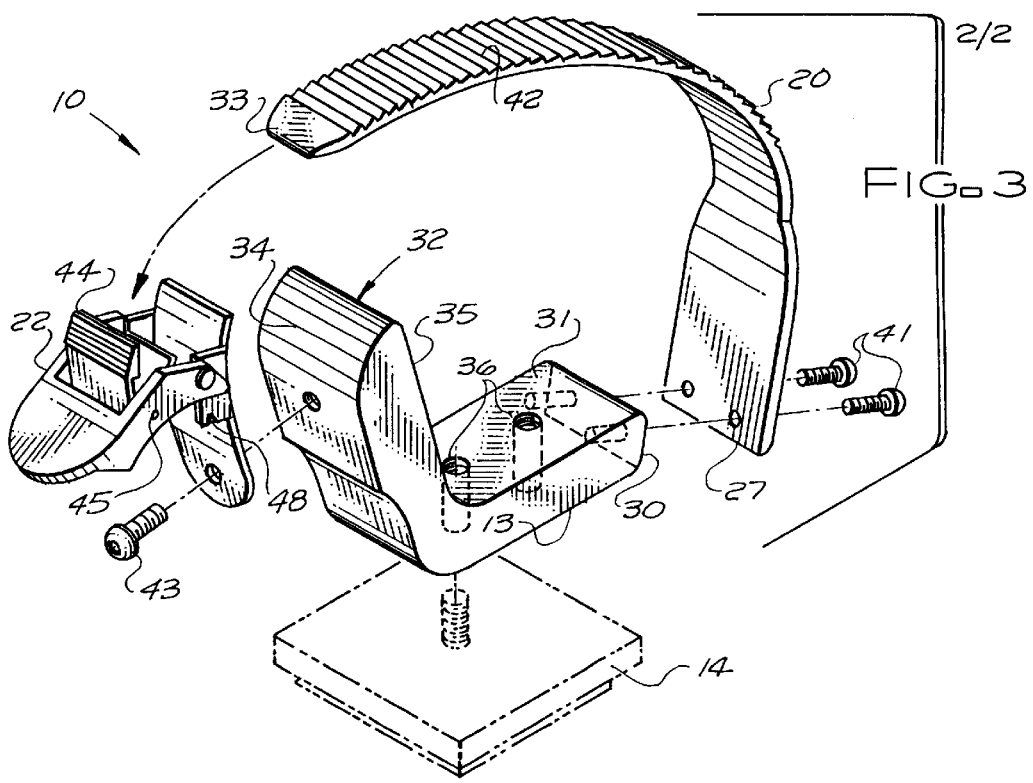
FIG. 3
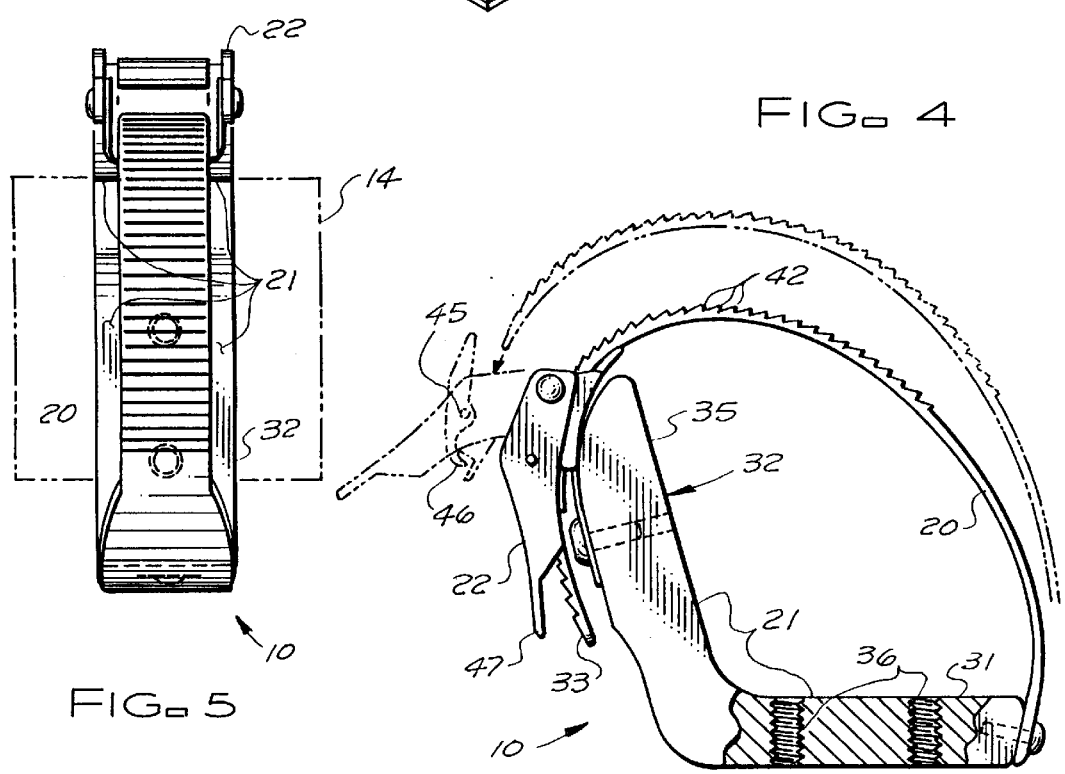
FIG. 4
FIG. 5

5,938,155

MOUNT SYSTEM FOR SUPPORTING BINOCULARS ON A TRIPOD

BACKGROUND OF THE INVENTION

1. Field of the Invention

This invention relates to providing a mount system for supporting binoculars on a tripod. More particularly, this invention concerns such a mount system wherein a single monocular barrel of such binoculars may be securely supported and mounted on such tripod for using such binoculars.

2. Description of the Prior Art

The general purpose of binoculars is to provide, using both eyes, an enlarged view of a distant object being observed. As the view is magnified and enlarged, and the field of view is decreased, it becomes increasingly more difficult to first locate and then remain directed at the object being viewed. Any unsteadiness or shaking of the binoculars may even result in losing the view of the object being observed. While observing and following a moving object, uneven or jerking movements may result in poor observations or again losing view of the object. This is a common problem encountered by hunters, bird watchers, etc. Additionally, once viewing is directed at a distant stationary object, such as a bird's nest, for example, the observer may be required to hold the binoculars steady and uninterrupted for a lengthy period of time, awaiting the sight wished to be observed. A tripod, of the conventional photographic type to which a camera would normally be mounted, would ideally provide an excellent platform for binoculars, while greatly improving their usage. Steady holding of binoculars, along with the means to smoothly pan on a moving object, would be the benefits of mounting binoculars to a tripod.

In the prior art, the mounting of binoculars to such things as camera tripods has been difficult, inefficient, and costly. For example, see U.S. Pat. No. 5,221,991 to Webster, describing a binocular mounting system which does not provide for unhindered and unrestrained adjustment of the binoculars; it is difficult in such a system, in which both monocular barrels of the binoculars are involved in the support, to efficiently make focal adjustments with the center focus system, and, especially, to make lateral spacing and adjustments of the left and right monocular barrels.

OBJECTS OF THE INVENTION

A primary object and feature of the present invention is to fulfill the above-mentioned need and overcome the above-mentioned problems by the provision of a mount system in which only a single monocular barrel in involved in the tripod support. A further primary object of the present invention is to provide such a mount system which is efficient, inexpensive, and handy. Other objects of this invention will become apparent with reference to the following invention descriptions.

SUMMARY OF THE INVENTION

According to a preferred embodiment of the present invention, this invention provides a mount system for supporting on a tripod binoculars having a pair of monocular barrels, such mount system comprising, in combination: normally-horizontal first rigid support means for supporting a bottom portion of a first such monocular barrel, such first rigid support means having a first end and a second end; first attachment means for attaching such first rigid support means to a panning head of a such tripod; second rigid support means, attached to such first end of such first rigid support means and rising generally upward from such first rigid support means, for supporting a first-side portion of such first monocular barrel; flexible support means for supporting a second-side portion of such first monocular barrel; and tightening means for tightening such support of such flexible support means to securely capture such first monocular barrel against such first and second rigid support means. It also provides such a mount system wherein an L-cross-sectioned cradle member comprises such first and second rigid supports.

Further, this invention provides such a mount system wherein such flexible support means comprises a strap having a first end and a second end. And it provides such a mount system further comprising: second attachment means for securely attaching such first end of such strap to such second end of such first rigid support means; and third attachment means for attaching such second end of such strap to such second rigid support means; wherein such third attachment means comprises such tightening means. It also provides such a mount system wherein such third attachment means comprises: clasp means, attached to such second rigid support means, for adjustably clasping such second end of such strap; and, further, wherein such clasp means comprises ratchet means for releasably adjusting such strap to securely capture such first monocular barrel against such first and second rigid support means, and such strap comprises projections for releasable holding by such ratchet means. Moreover, it provides such a mount system wherein: such ratchet means comprises release means for user-operated releasing of such clasping of such strap; and such release means is operable, from an outward and upward portion of such mount system, by a user.

Additionally, this invention provides such a mount system wherein such tightening means comprises ratchet means for releasably adjusting such flexible support means for tightening such support of such flexible support means to securely capture such first monocular barrel against such first and second rigid support means; and, further, wherein such ratchet means comprises release means for user-operated releasing of such clasping of such strap, and such release means is operable, from an outward and upward portion of such mount system, by a user.

Even further, according to a preferred embodiment thereof, the present invention provides a mount system for supporting on a tripod binoculars having a pair of monocular barrels, such mount system comprising, in combination: unitary cradle means for rigidly supporting a bottom portion and a first-side portion of a first such monocular barrel; first attachment means for attaching such unitary cradle means to a panning head of a such tripod; flexible support means for supporting a second-side portion of such first monocular barrel; and tightening means for tightening such support of such flexible support means to securely capture such first monocular barrel against such unitary cradle means; such mount system being structured and arranged in such manner as to provide secure tripod support for such binoculars without support by such mount system of a second such monocular barrel.

And moreover, this invention provides such a mount system wherein such unitary cradle means comprises a rigid member having a substantially L-shaped cross section; and, further, wherein a first arm of such L-shaped cross-section is normally substantially horizontal and a second arm of such L-shaped cross-section is normally substantially vertical; and, further, wherein the included angle between such first arm of such L-shaped cross-section and such second arm of such L-shaped cross-section is about fifteen degrees greater than a right angle; and, further, wherein such first arm of such L-shaped cross-section comprises such first attachment means. And it also provides such a mount system wherein such flexible support means comprises a strap having a first end and a second end; and such tightening means comprises second attachment means for securely attaching such first end of such strap to one end of such unitary cradle means, and third attachment means for adjustably attaching such second end of such strap to another end of such unitary cradle means.

Even additionally, according to a preferred embodiment thereof, this invention provides a mount system for supporting on a tripod binoculars having a pair of monocular barrels and providing unrestricted adjusting of such binoculars by a user-viewer, such mount system comprising the steps of: securely grasping a circular objective-lens end portion of a first such monocular barrel of such binoculars with a holding member while leaving unsupported by such holding member a second such monocular barrel of such binoculars; attaching such holding member to a panning head of a such tripod in such manner as to provide secure tripod support for such binoculars and unrestricted binoculars-adjusting ability. And it further provides such a mount system wherein: such holding member comprises a unitary L-shaped rigid cradle having first and second arms; and such grasping comprises the step of placing such circular objective-lens end portion of such first monocular barrel of such binoculars into such cradle in such manner that a first location on such circular objective-lens end portion is in contact with such first arm and a second location on such circular objective-lens end portion is in contact with such second arm.

Also, this invention provides such a mount system wherein; such holding member comprises a strap; and such grasping further comprises the step of tightening such strap against such circular objective-lens end portion of such first monocular barrel of such binoculars in such manner as to securely lock such circular objective-lens end portion against such first arm at such first location and against such second arm at such second location. And it provides such a mount system further comprising the step of arranging such grasping so that the angle of grasping of such first monocular barrel produces a normal horizontal binoculars position when such holding member is attached to such panning head of such tripod; and, further, comprising the step of, when such holding member comprises a strap, tightening such strap during such grasping of a portion of such first monocular barrel to make such grasping secure; and, further, comprising the step of, after use of such binoculars supported by such tripod, unattaching such holding member from such panning head; and, further, comprising the step of, after use of such binoculars supported by such tripod, loosening such strap to un-grasp such portion of such first monocular barrel of such binoculars, thereby releasing such binoculars from such holding member.

Yet further, according to a preferred embodiment thereof, this invention provides a mount system for supporting on a tripod binoculars having a pair of monocular barrels, such mount system comprising, in combination: holding means for secure grasping of a portion of a first such monocular barrel; attachment means for attaching such holding means to a panning head of a such tripod; such mount system being structured and arranged in such manner as to provide secure tripod support for such binoculars without support by such mount system of a second such monocular barrel.

BRIEF DESCRIPTION OF THE DRAWINGS

FIG. 3 is a perspective exploded view of the illustrated binoculars mount system.

FIG. 4 is a front elevation view of the illustrated binoculars mount system.

FIG. 5 is a top plan view of the illustrated binoculars mount system.

DETAILED DESCRIPTION OF A PREFERRED EMBODIMENT AND THE BEST MODE OF PRACTICE

Figure 1:
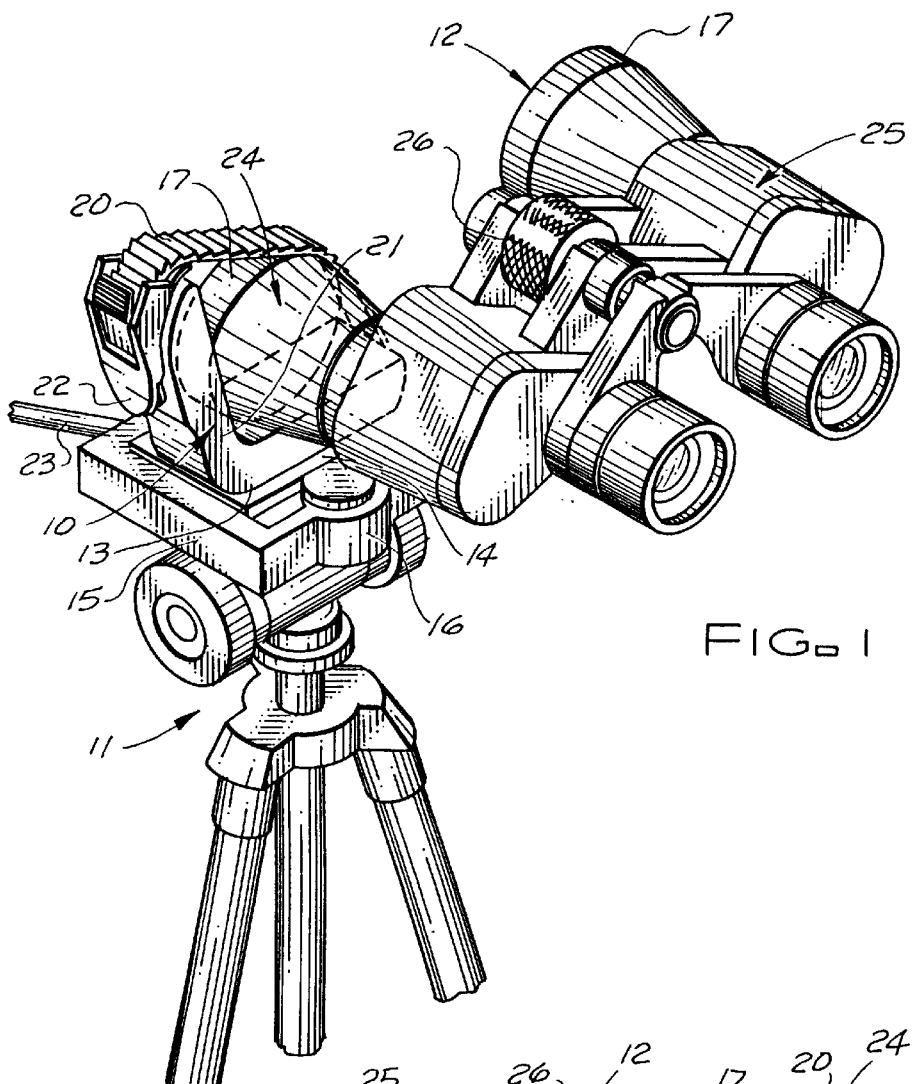
FIG. 1 is a perspective view of typical binoculars mounted in a preferred way atop a typical tripod, illustrating a preferred embodiment of a mount system according to the present invention.

In FIG. 1 is shown a preferred embodiment of the binoculars mount system of the present invention, embodied by a mount 10, secured to the top of a tripod 11, and holding binoculars 12. As herein stated, the primary object and purpose of the mount 10 is to provide a system for mounting and for holding binoculars 12 in a steady, stable manner, while allowing the benefits of controlled panning motions that the tripod 11 offers, while also efficiently permitting the normal binocular adjustments a user might make during viewing. A tripod 11, which is of the conventional photographic type to which a camera would normally be mounted, provides an excellent platform for binoculars 12, while greatly improving their usage.

Mounted to the horizontal bottom surface 13 of the mount 10 is a quick release plate 14, which is the releasably attaching portion of the quick release platform 15 of the pan head 16 of the tripod 11. With the plate 14 attached to the quick release platform 15, the mount 10 becomes integral with the tripod 11. The binoculars 12 may, then or previously, be securely strapped, preferably at a circular objective-lens portion 17 thereof (as shown), with strap 20, to the interior cradle 21 of the mount 10. The strap 20 is drawn tight around the binoculars 12 and locked in place to the mount 10 with clasp 22. Thus, the binoculars 12 are attached to the tripod 11 in a stable manner and may be aimed at the viewed object with the panning action of the pan head 16 as directed with handle 23. Additionally, the binoculars 12 may be raised or lowered to suit the observers needs through the usual height adjustments of the tripod 11. The binoculars 12 may be easily removed from the tripod 11 in one of two ways. The plate 14 may be released from the quick release platform 15, leaving the plate 14 attached to the mount 10, and providing for quick remounting of the binoculars 12 to the tripod 11. Or the binoculars 12 may be removed from the mount 10 by opening the clasp 22, thus releasing the straps 20 grip of the binoculars 12.

Figure 2:
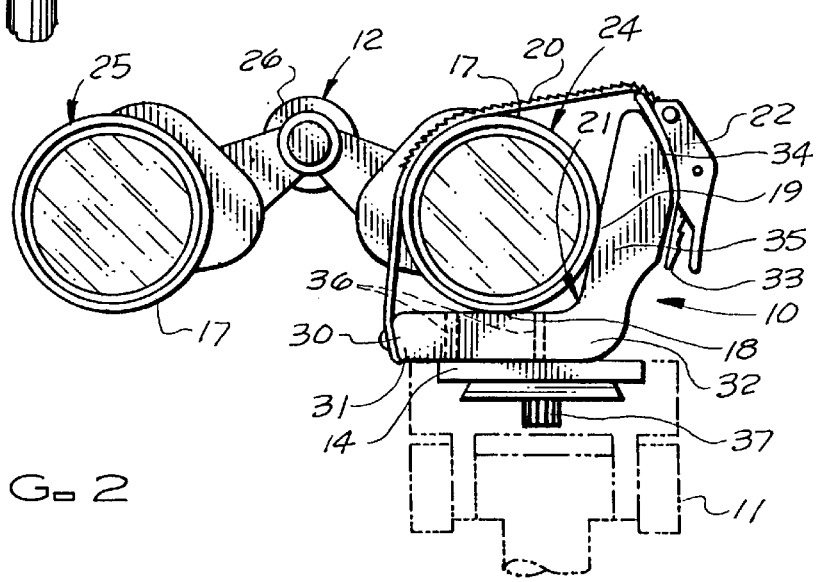
FIG. 2 is an elevation view of such binoculars attached to the mount system of FIG. 1.

Only one monocular barrel of binoculars 12, as illustrated in FIG. 1 and additionally in FIG. 2, for example, the left monocular barrel 24, is secured to the mount 10 with strap 20. The remaining monocular barrel, the right monocular barrel 25, and, additionally, the center focus system 26 of the binoculars 12, are free from securement or contact with the mount 10. This provides for unhindered and unrestrained adjustment of the binoculars 12, including focal adjustments with the center focus system 26 and, especially, lateral spacing and adjustments of the left and right monocular barrels, 24 and 25. The mount 10 may be used to mount either the left monocular barrel 24 or the right monocular barrel 25 (preferably, as stated, at an end portion 17) of the binoculars 12, with the remaining monocular barrel remaining unsecured. Whether the left monocular barrel 24 or the right monocular barrel 25 is strapped to the mount 10, is determined by the user's preference, which is often determined by the "handedness" of the user-viewer. Thus, a preferred step in Bathe system of the present invention is the secure grasping of a circular objective-lens end portion of a first such monocular barrel of such binoculars with a holding member while leaving unsupported by such holding member a second such monocular barrel of such binoculars.

In FIG. 2, the binoculars 12 are shown in a front elevation view to better illustrate the securement of the binoculars 12 to the mount 10. Preferably, the circular objective-lens end portion 17 of the left monocular barrel 24 (for most right-handed users) is positioned, as shown, into the interior cradle 21 of the mount 10. The circular objective-lens end portion 17 of monocular barrel 24 of binoculars 12 is placed into cradle 21 in such manner that a first location 18 on circular objective-lens end portion 17 is in contact with a first arm of the L-shaped cradle 21 and a second location 19 on circular objective-lens end portion 17 is in contact with a second arm of L-shaped cradle 21, as shown. Strap 20 then is encircled around lens portion 17 and strap 20 is then tightened against circular objective-lens end portion 17 in such manner as to securely lock circular objective-lens end portion 17 against such first arm at such first location 18 and against such second arm at such second location 19. Strap 20 (embodying herein the flexible support means for supporting a second-side portion of such monocular barrel) encircles the left monocular barrel 24, as shown. The fixed end 27 of strap 20 is preferably permanently attached to the outward end 30 of the first arm, the lower horizontal leg 31, of the rigid support or mount body 32 of mount 10. Leg 31 embodies the normally-horizontal first rigid support means for supporting a bottom portion of a monocular barrel according to this invention. The free end 33 of strap 20, before engagement with clasp 22 (embodying herein tightening means for tightening such support of such flexible support means to securely capture such monocular barrel against such first and second rigid support means 31 and 32), may be passed around the left monocular barrel 24. After encircling the left monocular barrel 24 (preferably the end portion 17 thereof), the free end 33 of strap 20 is inserted into the clasp 22, as shown in the figures, and pulled tight before locking the clasp 22. Clasp 22 is preferably permanently attached, as shown, to the top outward surface 34 of the second arm of cradle 21, approximately-vertical leg 35. Clasp 22 serves three functions with strap 20—it adjustably grips strap 20 at a proper location for securing the binoculars 12, it draws strap 20 taut, and it then locks strap 20 in the taut position. As shown, this tightly holds the left monocular barrel 24 of the binoculars 12 in the interior cradle 21 of the mount 10. The lower horizontal (normally) leg 31 of the mount body 32 of the mount 10 contains attachment means for attaching such first rigid support means to a panning head of a such tripod, embodied herein by two vertical holes 36, either one of which, at the user's preference, is the attachment location for the plate 14 of the quick release platform 15 of the tripod 11. The typical plate 14 incorporates a ¼-20 N.C. screw 37 which may be tightened from the underside of the plate 14 into either vertical hole 36 of the mount 10. Once the plate 14 is secured to the mount 10, it may be mounted upon the tripod 11, shown by dotted lines, in ways familiar to those skilled in the art of mounting cameras to tripods.

The mount 10 is shown in an exploded perspective view in FIG. 3, illustrating its components and features. The mount body 32 is the portion of the mount 10 to which all other components are attached. The mount body 32 (embodying herein an L-cross-sectioned cradle member) consists of a lower horizontal (when in use) leg 31 and approximately-vertical leg 35 (embodying in this invention a second rigid support means, attached to such first end of such first rigid support means and rising generally upward from such first rigid support means, for supporting a first-side portion of such first monocular barrel), which together form an approximate "L" shape (in cross-section, as shown). This L-shape makes a particularly effective cradle when supporting a circle-shaped member (e.g., end portion 17) in that the circle-shaped member is securely supported and automatically "centered" so that it has no tendency to move when strapped. It has been found that, for best secure-holding results, especially for such circle-shaped members, approximately-vertical leg 35 should preferably angle outward at approximately 15 degrees from vertical. Thus, the arms of the L-shaped-cross-sectioned cradle member or mount body 32 have preferably, as shown, an included angle of about 15 degrees more than a right angle. The mount body 32 is preferably approximately 1" in width and the height (or thickness) of the lower horizontal leg 31 is preferably approximately ½". The thickness of the approximately-vertical leg 35 towards its upper end where clasp 22 is attached, is preferably approximately ¾". The lower horizontal leg 31 preferably includes two vertical holes 36, threaded ¼-20 N.C. for attachment of the quick release plate 14 (shown with dotted lines) of the tripod 11 to the bottom surface 13 of the lower horizontal leg 31. The mount body 32 must provide a rigid support and is preferably machined to shape from 6061-T6 aluminum or other equivalent strength aluminum alloy. Thus, mount body 32 embodies herein a unitary cradle means for rigidly supporting a bottom portion and a first-side portion of a first such monocular barrel.

Preferably securely attached to the outward end 30 of the lower horizontal leg 31 with two hex socket button head machine screws 41, is the fixed end 27 of strap 20. Strap 20 projects upward from the lower horizontal leg 31 of the mount body 32 so that its free end 33 may be grasped by clasp 22, embodying herein a clasp means, attached to such second rigid support means 32, for adjustably clasping such second end 33 of such strap 20. Strap 20 is preferably made of an about ⅛" thick flexible plastic and is preferably approximately 8" long. Preferably, starting approximately 3" from the fixed end 27 and continuing to the free end 33, the strap 20 is approximately ⅝" wide and incorporates toothed ratchet-type serrations 42, perpendicular to the length of the strap 20, and on the flat outer surface, the aside opposite the binoculars contacting surface. These toothed serrations 42 aid in the drawing of the strap 20 tightly around the monocular barrel of the binoculars, as shown in FIGS. 1 and 2, and providing a positive ratchet-type clamping by the clasp 22. Attached to the top outward surface 34 of the approximately-vertical leg 35 of the mount body 32 is the clasp 22. It is secured in place with a #10-32 hex socket button head screw 43. A preferred clasp 22 is a product of Seneca Sports, Inc., Milford, Mass. having part number 7629. A spring-loaded catch-and release member 44 (mounted on pin 45 and having a tooth-catcher 46, see FIGS. 4 and 3), when depressed, allows release from the ratchet-type holding of a serration 42 and adjustment of the engagement of the strap 20 within the clasp 22. When depressed into place by pushing on clasp end 47, in a well-known manner, the clasp 22 locks and tensions the strap 20 for a tight grasp of the binoculars barrel. In such locking of clasp 22, pin 45 is captured by indent 48. That is, according to the present invention, such clasp means comprises ratchet means for releasably adjusting such strap to securely capture such first monocular barrel against such first and second rigid support means; and such strap comprises projections for releasable holding by such ratchet means; and such ratchet means comprises release means for user-operated releasing of such clasping of such strap; and such release means is operable, from an outward and upward portion of such mount system, by a user.

A side elevation view of the mount 10 is shown in FIG. 4. The lower horizontal leg 31 of the mount body 32 incorporates two vertical holes 36, either of which may be utilized for securement to the tripod. The clasp 22, attached to the approximately-vertical leg 35 of the mount body 32, is shown in the depressed position where tension is applied to strap 20. The free end 33 of the strap 20 is inserted into the clasp 22 the required amount necessary to firmly grasp the binoculars when tensioned. When tensioned, the strap 20, encircling the lens housing monocular barrel of the binoculars, draws the monocular barrel in firm contact with the interior cradle 21 of the mount 10. The toothed serrations 42 of the strap 20 permit positive engagement of the strap 20 to the clasp 22. With the clasp 22 in the open or released position, as shown with dotted lines, the strap 20 tension is released and the binoculars may be either installed within, or removed from the mount 10.

Shown in FIG. 5 is a top view of the mount 10. The location of the plate 14 for attachment to the quick release platform is shown in dotted lines. When held, the binoculars 12 are securely drawn into the interior cradle 21 of the mount body 32 by the strap 20. The clasp 22 provides for adjustment and tensioning of the strap 20 in a well-known manner.

As has been described, this invention thus provides a mount system for supporting on a tripod binoculars having a pair of monocular barrels and providing unrestricted adjusting of such binoculars by a user-viewer, such mount system comprising the steps of: securely grasping a circular objective-lens end portion of a first such monocular barrel of such binoculars with a holding member while leaving unsupported by such holding member a second such monocular barrel of such binoculars; attaching such holding member to a panning head of a such tripod in such manner as to provide secure tripod support for such binoculars and unrestricted binoculars-adjusting ability; wherein such holding member comprises a unitary L-shaped rigid cradle having first and second arms and such grasping comprises the step of placing such circular objective-lens end portion of such first monocular barrel of such binoculars into such cradle in such manner that a first location on such circular objective-lens end portion is in contact with such first arm and a second location on such circular objective-lens end portion is in contact with such second arm; wherein such holding member comprises a strap and such grasping further comprises the step of tightening such strap against such circular objective-lens end portion of such first monocular barrel of such binoculars in such manner as to securely lock such circular objective-lens end portion against such first arm at such first location and against such second arm at such second location; arranging such grasping so that the angle of grasping of such first monocular barrel produces a normal horizontal binoculars position when such holding member is attached to such panning head of such tripod; when such holding member comprises a strap, tightening such strap during such grasping of a portion of such first monocular barrel to make such grasping secure; after use of such binoculars supported by such tripod, unattaching such holding member from such panning head; and after use of such binoculars supported by such tripod, loosening such strap to un-grasp such portion of such first monocular barrel of such binoculars, thereby releasing such binoculars from such holding member.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A mount system for supporting on a tripod binoculars having a pair of monocular barrels, said mount system comprising, in combination:
  a. normally-horizontal first rigid support means for supporting a bottom portion of a first said moncular barrel, said first rigid support means having a first end and a second end;
  b. first attachement means for attaching said first rigid support means to a panning head of a said tripod;
  c. second rigid support means, attached to said first end of said first rigid support means and rising generally upward from said first rigid support means, for supporting a first side portion of said first monocular barrel;
  d. flexible support means, attached to at least one of said first rigid support means and said second rigid support means for supporting a second-side portion of said first monocular barrel;
  e. tightening means, at least one of said first rigid support means and said second rigid support means for tightening said flexible support means to securely capture said first monocular barrel against said first and second rigid support means.

2. The mount system according to claim 1 wherein said first and second rigid support means comprise together an L-cross-sectioned structure.

3. The mount system according to claim 1 wherein said flexible support means comprises a strap having a first end and a second end.

4. The mount system according to claim 3 further comprising:
  a. second attachment means for securely attaching said first end of said strap to said second end of said first rigid support means; and
  b. third attachment means for attaching said second end of said strap to said second rigid support means;
  c. wherein said third attachment means comprises said tightening means.

5. The mount system according to claim 4 wherein said third attachment means comprises:
  a. clasp means, attached to said second rigid support means, for adjustably clasping said second end of said strap.

6. The mount system according to claim 5 wherein:
  a. said clasp means comprises ratchet means for releasably adjusting said strap to securely capture said first monocular barrel against said first and second rigid support means; and
  b. said strap comprises projections for releasable holding by said ratchet means.

7. The mount system according to claim 6 wherein:
  a. said ratchet means comprises release means for user-operated releasing of said clasp means; and b. said release means is operable, from an outward and upward portion of said mount system by a user.

8. The mount system according to claim 1 wherein:
   a. said tightening means comprises ratchet means for releasably adjusting said flexible support means for tightening said flexible support means to securely capture said first monocular barrel against said first and second rigid support means.

9. The mount system according to claim 8 wherein:
   a. said ratchet means comprises release means for user-operated releasing of said flexible support means to release said first monocular barrel from capture; and
   b. said release means is operable, from an outward and upward portion of said mount system, by a user.

10. A mount system for supporting on a tripod binoculars having a pair of monocular barrels, said mount system comprising, in combination:
    a. unitary cradle means for rigidly supporting a bottom portion and a first-side portion of a first said monocular barrel;
    b. first attachment means for attaching said unitary cradle means to a panning head of a said tripod;
    c. flexible support means attached to said unitary cradle means, for supporting a second-side portion of said first monocular barrel; and
    d. tightening means, attached to said unitary cradle means, for tightening said support of said flexible support means to securely capture said first monocular barrel against said unitary cradle means;
    e. said mount system being structured and arranged in such manner as to provide secure tripod support for said binoculars without support by said mount system of a second said monocular barrel.

11. The mount system according to claim 10 wherein said unitary cradle means comprises a rigid member having a substantially L-shaped cross section.

12. The mount system according to claim 11 wherein a first arm of said L-shaped cross-section is normally substantially horizontal and a second arm of said L-shaped cross-section is normally substantially vertical.

13. The mount system according to claim 12 wherein an angle between said first arm of said L-shaped cross-section and said second arm of said L-shaped cross-section is about fifteen degrees greater than a right angle.

14. The mount system according to claim 12 wherein said first arm of said L-shaped cross-section comprises said first attachment means.

15. The mount system according to claim 14 wherein:
    a. said flexible support means comprises a strap having a first end and a second end; and
    b. said tightening means comprises
       i. second attachment means for securely attaching said first end of said strap to one end of said unitary cradle means; and
       ii. third attachment means for adjustably attaching said second end of said strap to another end of said unitary cradle means.

16. A method of use of a system for supporting on a tripod a binoculars having a pair of monocular barrels and providing unrestricted adjusting of said binoculars by a user-viewer, said mount system comprising the steps of:
    a. securely grasping a circular objective-lens end portion of a first said monocular barrel of said binoculars with a holding member while leaving unsupported by said holding member a second said monocular barrel of said binoculars;
    b. attaching said holding member to a panning head of a said tripod in such manner as to provide secure tripod support for said binoculars and unrestricted binoculars-adjusting ability.

17. The method according to claim 16 wherein:
    a. said holding member comprises a unitary L-shaped rigid cradle having first and second arms; and
    b. said grasping comprises the step of placing said circular objective-lens end portion of said first monocular barrel of said binoculars into said cradle in such manner that a first location on said circular objective-lens end portion is in contact with said first arm and a second location on said circular objective-lens end portion is in contact with said second arm.

18. The method according to claim 17 wherein;
    a. said holding member comprises a strap; and
    b. said grasping further comprises the step of tightening said strap against said circular objective-lens end portion of said first monocular barrel of said binoculars in such manner as to securely lock said circular objective-lens end portion against said first arm at said first location and against said second arm at said second location.

19. The method according to claim 18 further comprising the step of:
    a. arranging said grasping so that the angle of grasping of said first monocular barrel produces a normal horizontal binoculars position when said holding member is attached to said panning head of said tripod.

20. The method according to claim 19 further comprising the step of:
    a. after use of said binoculars supported by said tripod, loosening said strap to un-grasp said portion of said first monocular barrel of said binoculars, thereby releasing said binoculars from said holding member.

21. The mount system for supporting on a tripod binoculars having a pair of monocular barrels, said mount system comprising, in combination:
    a. holding means for secure grasping of a portion of a first said monocular barrel;
    b. attachment means for attaching said holding means to a panning head of a said tripod;
    c. said mount system being structured and arranged in such manner as to provide secure tripod support for said binoculars without support by said mount system of a second said monocular barrel.

* * * * *

UNITED STATES PATENT AND TRADEMARK OFFICE
CERTIFICATE OF CORRECTION

PATENT NO. : 5,938,155
DATED : August 17, 1999
INVENTOR(S) : Randy N. Garland

It is certified that error appears in the above-identified patent and that said Letters Patent is hereby corrected as shown below:

In Column 8, line 30 (Claim 1), after "means", insert a comma -- , --.

In Column 8, line 32 (Claim 1), after "means,", insert -- attached to --.

In Column 8, line 33 (Claim 1), after "means", insert a comma -- , --. (2nd occ.)

In Column 9, line 2 (Claim 7), after "system", insert a comma -- , --.

In Column 9, line 24 (Claim 10), after "means", insert a comma -- , --.

In Column 10, line 1 (Claim 16), after "a" and prior to "system", insert -- mount --.

Signed and Sealed this

Twenty-fifth Day of January, 2000

Attest:

Attesting Officer

*Acting Commissioner of Patents and Trademarks*